United States Patent
Riddoch

(10) Patent No.: US 6,830,440 B1
(45) Date of Patent: Dec. 14, 2004

(54) EXTERNAL ROTOR BRUSHLESS DC MOTOR

(75) Inventor: Henry J. Riddoch, Wemyss Bay (GB)

(73) Assignee: Minebea Co. Ltd. (JP)

( * ) Notice: Subject to any disclaimer, the term of this patent is extended or adjusted under 35 U.S.C. 154(b) by 17 days.

(21) Appl. No.: 10/089,839

(22) PCT Filed: Oct. 4, 2000

(86) PCT No.: PCT/GB00/03816

§ 371 (c)(1), (2), (4) Date: Aug. 6, 2002

(87) PCT Pub. No.: WO01/28074

PCT Pub. Date: Apr. 19, 2001

(30) Foreign Application Priority Data

Oct. 8, 1999 (GB) .............................................. 9923900

(51) Int. Cl.[7] .............................................. F04B 35/04
(52) U.S. Cl. ..................... 417/353; 417/354; 417/423.7
(58) Field of Search ................................ 417/353, 354, 417/423.7

(56) References Cited

U.S. PATENT DOCUMENTS

| 5,071,322 | A | * | 12/1991 | Maekawa ................. 417/423.7 |
| 5,217,353 | A | * | 6/1993 | De Filippis .................. 417/354 |
| RE34,456 | E | * | 11/1993 | Harmsen et al. ............ 417/354 |
| 6,175,171 | B1 | * | 1/2001 | Rupp et al. .................... 310/52 |
| 6,488,485 | B1 | * | 12/2002 | Rupp et al. ............... 417/423.7 |

OTHER PUBLICATIONS

US2002/0187059 A1;Electric Fan; Gold et al.; Dec. 12, 2002.*

* cited by examiner

Primary Examiner—Cheryl J. Tyler
(74) Attorney, Agent, or Firm—Ipsolon LLP

(57) ABSTRACT

An external rotor brushless DC motor for use in a fan, or other similar application, the motor including a stator assembly base having a base plate, a number of stator windings affixed to the stator base, and circuitry associated with the motor, wherein the base plate is disposed between the circuitry and the stator windings.

28 Claims, 3 Drawing Sheets

EXTERNAL ROTOR BRUSHLESS DC MOTOR

FIELD OF THE INVENTION

THIS INVENTION relates to an external rotor brushless DC motor.

BACKGROUND

For many years external rotor brushless DC motors have been manufactured in accordance with a conventional topography. An example of such a conventional topography of a brushless DC motor is shown in FIG. 1 of the accompanying drawings. The basic premise of this topography is that the stator assembly has a stator assembly base with a recess therein. The driving and control circuitry for the motor is attached to the stator assembly base in the recess, the stator windings being located above the circuitry such that the circuitry is sandwiched in the recess between the stator windings and the stator assembly base. Typically, the stator windings and the circuitry are permanently affixed to the stator assembly base.

Despite drawbacks associated with this topography, there have been little or no attempts to deviate from the conventional topography described above since this type of motor was first made over 20 years ago.

There are a number of drawbacks associated with the above described conventional motor topography. These drawbacks all stem from the conventional location of the printed circuit board at a position between the stator assembly base and the stator windings. For example, since the stator windings are almost always permanently affixed to the stator assembly base, it is extremely difficult to modify or repair the circuitry or components on the printed circuit board without at least partially damaging or destroying the stator windings, or the assembly base. It is often the case that it is cheaper to scrap a motor rather than to attempt to repair or maintain the circuitry associated with the motor.

A further drawback is that it is difficult to dissipate heat, generated by both the motor and the circuitry on the printed circuit board, away from the motor.

Another drawback is that it is difficult to seal the printed circuit board and the components thereon from the ingress of dust and moisture.

A further drawback is that it is also difficult to dissipate the heat, generated by both the motor and the drive circuitry on the printed circuit board, which in many cases restricts the power output of the motor.

SUMMARY OF THE INVENTION

It is an object of the present invention to seek to provide an external rotor brushless DC motor which does not suffer from the above-mentioned drawbacks.

Accordingly, one aspect of the present invention provides an external rotor brushless DC motor comprising: a stator assembly base having a base plate; a winding assembly affixed to the stator assembly base; and circuitry associated with the motor, wherein the base plate is disposed between the circuitry and the winding assembly and is provided with a cover to define an enclosure, the circuitry being located between the base plate and the cover within the enclosure which is hermetically sealed.

Preferably, the circuitry is attached to or supported by the base plate.

Conveniently, the base plate comprises a substantially circular base plate having a substantially cylindrical side wall, the side wall defining a recess within which the circuitry is located.

Advantageously, the stator assembly base include means for supporting the stator windings.

Preferably, the stator assembly base is manufactured from aluminium or any other material with good thermal conduction.

Conveniently, the circuitry is in the form of a printed circuit board having a plurality of components mounted thereon, the components on the printed circuit board being positioned on either or both surfaces of the printed circuit board.

Preferably at least some, if not all of the high power dissipating components on the printed circuit board can overhang the printed circuit board and be attached to the assembly base P, hence conducting the heat directly into the assembly base, alternatively the heat dissipating components can be located over an aperture in the printed circuit board allowing them to be clamped to a projecting area on the assembly base so conducting the heat into the assembly base.

Another aspect of the present invention provides a fan incorporating a motor embodying the present invention.

Advantageously, the fan has a frame which is manufactured from a plastic material or other low cost easily manufactured material.

Conveniently, the motor has a cover plate and the cover plate comprises a part of the fan housing which is so constructed that the outer edge of the assembly base is in the airflow of the fan and hence cooled by the said airflow.

In order that the present invention may be more readily understood, embodiments thereof will now be described, by way of example, with reference to the accompanying drawings, in which:

DETAILED DESCRIPTION OF THE PREFERRED EMBODIMENTS OF THE INVENTION

Figure 1:
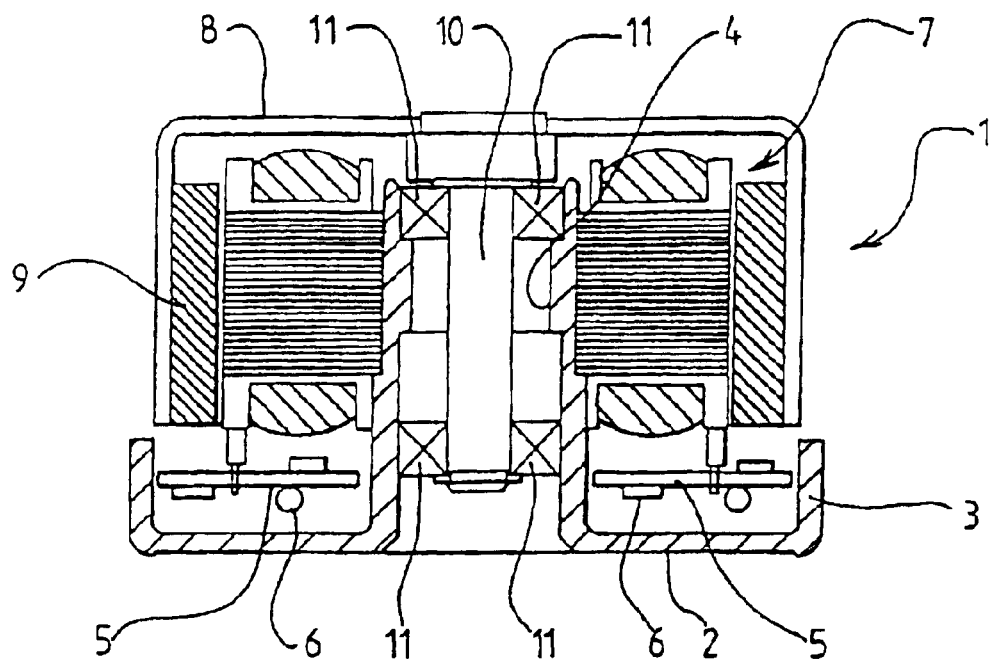
FIG. 1 is a cross-section through a conventional brushless DC motor.

Referring now to FIG. 1, this shows a conventional topography of an external rotor brushless DC motor 1. The motor 1 comprises a stator assembly and a rotor assembly. The stator assembly has a stator assembly base which comprises a substantially circular base 2 having an outer upstanding cylindrical side wall 3. A central cylindrical column 4 is also upstanding from the centre of the circular base 2 and is concentric with the cylindrical side wall 3 so as to define an annular space between the cylindrical side wall 3 and the column 4. It is conventional for the driving and control circuitry of the motor to be housed within this annular space, typically on an annular printed circuit board 5 with the main surface of the printed circuit board 5 which carries all the components 6 being oriented toward the base 2. The printed circuit board 5 is typically permanently connected to and attached to a plurality of multipole stator laminations with windings around each pole forming a stator winding assembly 7 which is attached to the stator assembly base and, more particularly, to the exterior of the column 4 directly above the base 2, the printed circuit board 5 thereby being sandwiched between the stator winding assembly 7 and the base 2. The stator winding assembly 7 is permanently attached to the column 2 preferably by a thermoset resin or other permanent adhesive. It should be appreciated that the annular space within which the printed circuit board 5 is to be affixed opens towards the stator winding assembly 7.

The rotor assembly comprises a rotor cup 8 having a series of permanent magnet poles of opposite polarity 9 arranged around the internal periphery thereof. The cup 8 is rotatably engaged in the column 4 by means of a shaft 10 held between two pairs of bearings 11 within the column 4.

The drawbacks associated with the above described conventional motor topography all stem from the conventional location of the printed circuit board at a position between the housing base 2 and the stator assembly 7 which are typically both permanently affixed together. It is, therefore, extremely difficult to modify or repair the circuitry or components on the printed circuit board without at least partially damaging or destroying the stator winding assembly or the bases.

Other drawbacks include the difficulty of sealing the printed circuit board and the components thereon from the ingress of dust and moisture and the difficulty of dissipating heat, generated by both the motor and the circuitry on the printed circuit board, away from the motor and isolating the electronic components from the heat generated within the stator winding assembly 7.

In order to address these problems, the present invention provides a departure from the conventional topography used in external rotor brushless DC motors. An example of a motor embodying the present invention in shown in FIG. 2.

Figure 2:
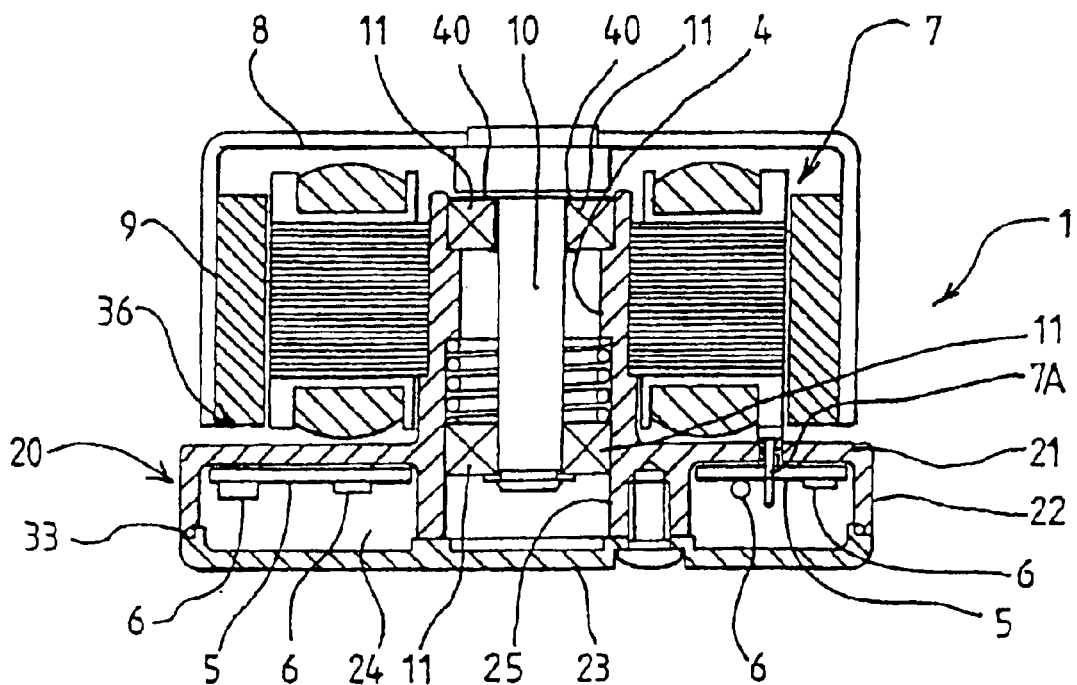
FIG. 2 is a cross-section through a first embodiment of an external rotor brushless DC motor according to the present invention.
Figure 3:
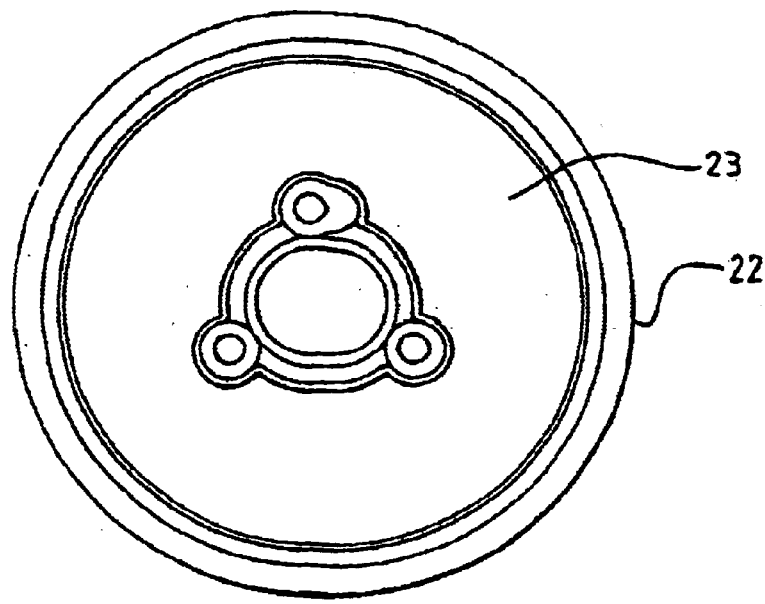
FIG. 3 is a plan view of the brushless DC motor of FIG. 2.

Referring now to FIGS. 2 and 3 and using the same reference numerals used in connection with the conventional motor assembly shown in FIG. 1, it will be apparent that the rotor assembly is no different and the stator winding assembly 7 is affixed to the column 4 in a conventional manner. However, the difference between the motor embodying the present invention and the conventional motor assembly shown in FIG. 1 lies in the base portion of the stator assembly.

The stator assembly base 20 of the motor 1 embodying the present invention comprises an effective inversion of the arrangement shown in FIG. 1. The stator assembly base 20 comprises a conventional column 4 upstanding from a circular base plate 21. A cylindrical side wall 22 projects from the base plate 21 in the opposite direction to the column 4, the side wall 22 thereby projecting away from the stator winding assembly 7, in the opposite direction to the column 4. Thus, there is no recess between the stator winding assembly 7 and the base plate 21 within which the printed circuit board 5 can be mounted.

In contrast to the conventional topography, the side wall 22 which depends away from the stator winding assembly 7 defines a space on the opposite side of the base plate 21 to the stator winding assembly 7 within which the circuitry associated with the motor can be mounted. Thus, the recess defined by the side wall 22 and the base plate 21 opens away from the stator winding assembly 7.

A cover plate 23 is seated on an internal step formed around the free edge of the side wall 22. An enclosure 24 is thereby defined between the base plate 21 and the cover plate 23 which is bounded by the side wall 22. Preferably, further bosses 25 or partition walls (not shown) are formed within the side wall 22 so as to provide, respectively, means by which the cover plate 23 can be secured to the base plate 21 and means to divide the main enclosure 24 into various sub-enclosures within the boundary of the side wall 22.

In the embodiment of the motor shown in FIG. 2, a printed circuit board 5 is attached to the base plate 21. The components 6 on the printed circuit board 5 are positioned on the opposite surface of the printed circuit board 5 to that adjacent the base plate 21. Therefore, the components 6 are readily accessible upon removal of the cover plate 23. Thus, the components 6 and circuitry of the printed circuit board 5 can be easily repaired or maintained without any need to cause damage to the winding assembly 7 or any other part of the stator assembly. Suitable wiring 7A connects the winding assembly 7 to the printed circuit board 5 through the base plate 21. The opening through which the wiring 7A passes through the base plate 21 is sealed by a rubber seal or the like.

The provision of the enclosure 24, within which to mount the printed circuit board for the motor, on the opposite side of the base plate 21 to the stator windings 7 provides other advantages. The enclosure 24 is hermetically sealable by a rubber O-ring 33 or other similar sealing arrangement so as to protect the circuitry and components within the enclosure 24 from the ingress of dust or moisture. Additionally, the thermal transfer properties of the motor are enhanced in that heat from the motor can be more readily dissipated through the stator assembly, along the base plate 21, down the side wall 22 and from the cover plate 23. External heat sinks or the like may be connected to the cover plate 23 to facilitate further heat sinking.

Preferably, the stator assembly base is manufactured from aluminium or any other thermally conductive material.

A further embodiment of the invention would use the same motor construction using a plastic or non-conductive base, allowing the hermetic sealing of the electronic components.

Figure 4:
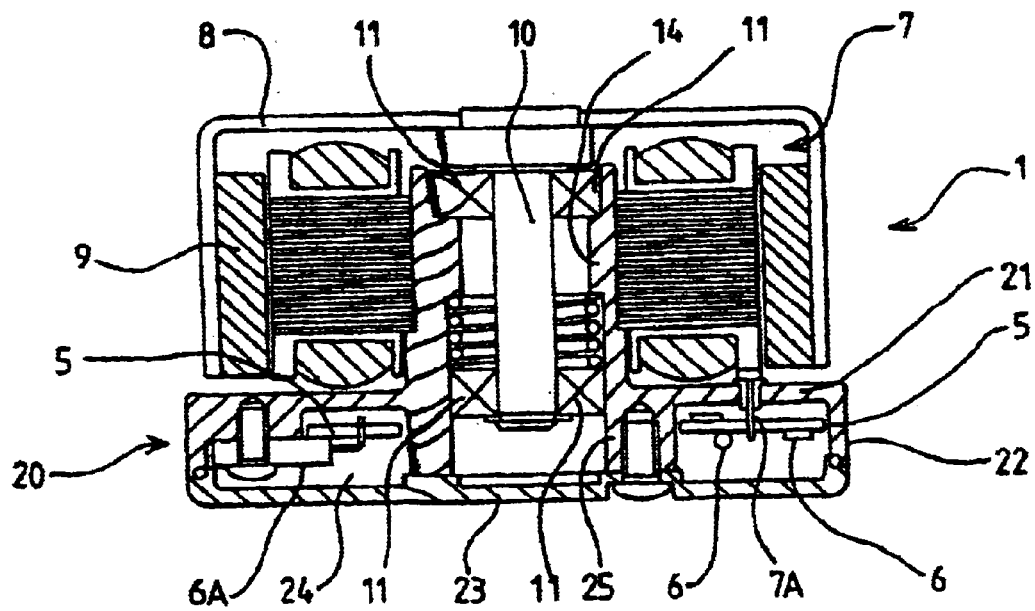
FIG. 4 is a cross-section through a second embodiment of an external rotor brushless DC motor according to the present invention.

FIG. 4 shows another embodiment of the motor in which one or more components 6A of the circuitry overhang the printed circuit board 5 so as to be attached directly to the base plate 21 hence conducting the heat directly into the base plate 21. This arrangement is especially advantageous for high power dissipating components.

Figure 5:
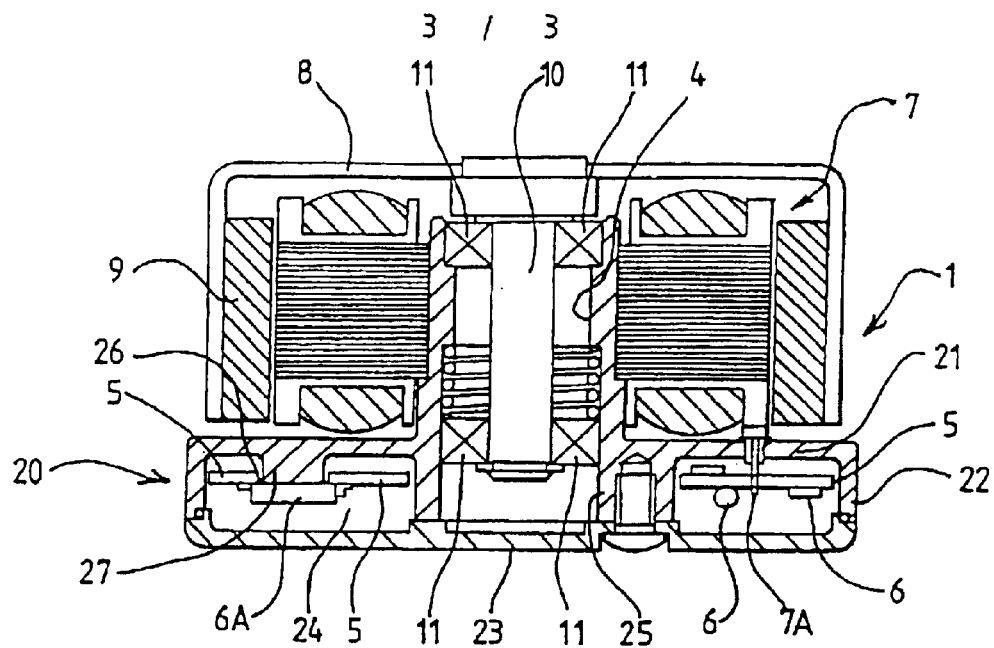
FIG. 5 is a cross-section through a third embodiment of an external rotor brushless DC motor according to the present invention.

FIG. 5 shows a further embodiment of the motor in which the printed circuit board 5 is provided with an aperture 26 through which an extension 27 from the base plate 21 projects. A high power dissipating component 6A is located over the aperture 26 on the opposite surface of the printed circuit board to the base plate 21. The extension 27 from the base plate 21 contacts the component 6A so as to provide a heat conduction path directly from the component 6A to the base plate 21.

One particular application for motors embodying the present invention is in the field of fans and ventilation equipment, particularly axial flow fans. Fans having high power brushless DC motors typically have a frame manufactured from aluminium because it is not possible to utilise cheaper plastics materials due to the heat generated from the motor.

Figure 6:
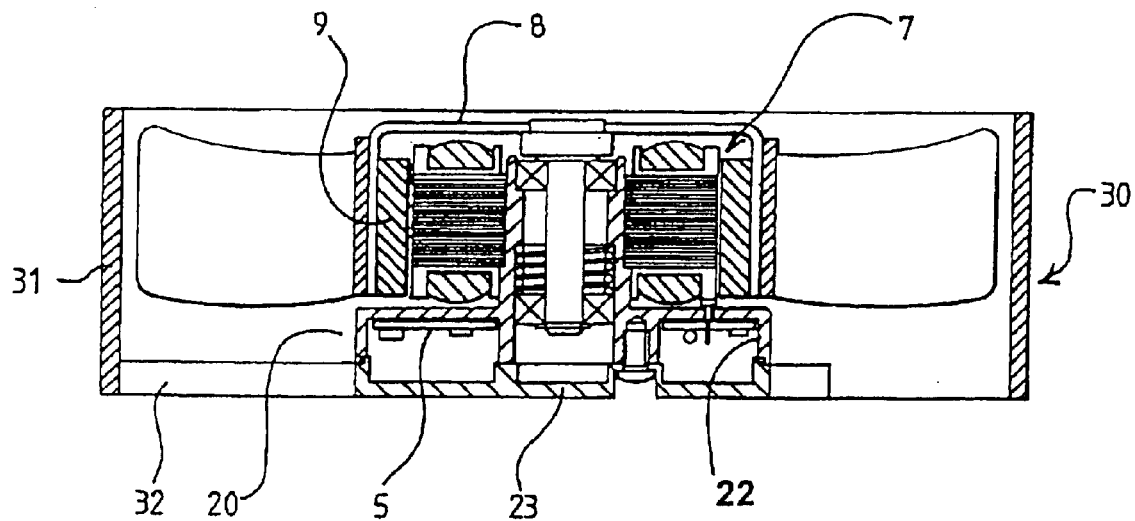
FIG. 6 is a schematic cross-section through a fan having a plastics frame incorporating a brushless DC motor embodying the present invention.

However, when using a motor embodying the present invention, it is possible to produce a fan 30 of hybrid construction having an aluminium stator assembly base 20 but with a plastic frame 31 as shown in FIG. 6. This is because the airflow created by the fan 30 will convect heat away from the motor 1. Airflow generated by the fan 30 passes over the side wall 22 of the stator assembly base 20 which comprises part of the heat transfer path away from the motor 1. Thus, the frame 31 of the fan 30 is subjected to less heat than would be experienced by a fan incorporating a conventional brushless DC motor. Preferably, the cover plate 23 for the stator assembly base 20 comprises a part of the fan housing 32 thereby providing an easy means by which the fan housing can be mechanically connected to the motor 1.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A fan having a frame manufactured from plastic material and incorporating an external rotor brushless DC motor, the motor comprising:
    a stator assembly base having a base plate;
    the stator assembly base being manufactured from a thermally conductive material;
    a winding assembly affixed to the stator assembly base;
    circuitry associated with the motor, wherein the base plate is disposed between the circuitry and the winding assembly and has a side wall depending away from the winding assembly, the side wall being within an air flow generated, in use, by the fan and comprising part of a heat transfer path to dissipate heat away from the motor; and
    the circuitry having heat generating components, wherein at least one of the heat generating components is mounted on a printed circuit board and overhangs an edge of the printed circuit board and attaches directly to the base plate hence conducting heat away from the overhanging component into the base plate.

2. A fan according to claim 1, wherein the circuitry is attached to or supported by the base plate.

3. A fan according to claim 1, wherein the side wall defines a recess within which the circuitry is located.

4. A fan according to claim 1, wherein the base plate is provided with a cover, the circuitry being located between the base plate and the cover.

5. A fan according to claim 1, wherein the circuitry is housed within an enclosure.

6. A fan according to claim 5, wherein the enclosure is hermetically sealed.

7. A fan according to claim 1, wherein the stator assembly base includes means for supporting the winding assembly.

8. A fan according to claim 1, wherein the circuitry includes a plurality of components mounted on the printed circuit board, and wherein the printed circuit board has a surface that is adjacent to the base plate.

9. A fan according to claim 8, wherein at least some of the components on the printed circuit board are positioned on the opposite surface of the printed circuit board to that adjacent the base plate.

10. A fan according to claim 8, wherein at least some of the components on the printed circuit board are positioned on the surface of the printed circuit board adjacent the base plate.

11. A fin according to claim 8, wherein the components are positioned on both surfaces of the printed circuit board.

12. A fan according to claim 1, wherein the winding assembly comprises a number of multipole stator laminations with windings.

13. A fan according to claim 1, wherein the motor has a cover plate and the cover plate comprises a part of the fan housing.

14. A fan according to any claim 1, wherein the stator assembly base is manufactured from aluminum.

15. A fan having a fame manufactured from plastic material and incorporating an external rotor brushless DC motor, the motor comprising:
    a stator assembly base having a base plate;
    the stator assembly base being manufactured from a thermally conductive material;
    a winding assembly affixed to the stator assembly base;
    circuitry associated with the motor, wherein the base plate is disposed between the circuitry and the winding assembly and has a side wall depending away from the winding assembly, the side wall being within an air flow generated, in use, by the fan and comprising part of a heat transfer path to dissipate heat away from the motor; and
    the circuitry having heat generating components, wherein at least one of the heat generating components is located proximal an aperture in a printed circuit board, a projection from the base plate contacting the at least one component through the aperture to conduct heat away from the contacted component into the base plate.

16. A fan according to claim 15, wherein the printed circuit board is attached to or supported by the base plate.

17. A fan according to claim 15, wherein the side wall defines a recess within which the circuitry is located.

18. A fan according to claim 15, wherein the base plate is provided with a cover, the circuitry being located between the base plate and the cover.

19. A fan according to claim 15, wherein the circuitry is housed within an enclosure.

20. A fan according to claim 19, wherein the enclosure is hermetically sealed.

21. A fan according to claim 15, wherein the stator assembly base includes mean for supporting the winding assembly.

22. A fan according to claim 15, wherein the circuitry includes a plurality of components mounted on the printed circuit board, and wherein the printed circuit board has a surface that is adjacent to the base plate.

23. A fan according to claim 22, wherein at least some of the components on the printed circuit board are positioned on the opposite surface of the printed circuit board to that adjacent the base plate.

24. A fan according to claim 22, wherein at least some of the components on the printed circuit board are positioned on the surface of the printed circuit board adjacent the base plate.

25. A fan according to claim 22, wherein the components are positioned on both surfaces of the printed circuit board.

26. A fan according to claim 15, wherein the winding assembly comprises a number of multipole stator laminations with windings.

27. A fan according to claim 15, wherein the motor has a cover plate and the cover plate comprises a part of the fan housing.

28. A fan according to claim 15, wherein the stator assembly base is manufactured from aluminum.

* * * * *